March 22, 1927.

J. J. CARTER 1,622,179

METHOD OF MAKING CLAMPING RINGS FOR COMMUTATORS

Filed Oct. 31, 1923

Inventor
John J. Carter
By Spencer Sewall and Hardman
His Attorneys

Patented Mar. 22, 1927.

1,622,179

UNITED STATES PATENT OFFICE.

JOHN J. CARTER, OF ANDERSON, INDIANA, ASSIGNOR, BY MESNE ASSIGNMENTS, TO DELCO-REMY CORPORATION, OF DAYTON, OHIO, A CORPORATION OF DELAWARE.

METHOD OF MAKING CLAMPING RINGS FOR COMMUTATORS.

Application filed October 31, 1923. Serial No. 672,009.

This invention relates to the manufacture of commutators in which an annulus of insulated segments are clamped together through the agency of V-rings which fit into annular V-grooves provided by the dovetail portions of the commutator segments.

One of the objects of the invention is to manufacture the V-rings at lower cost than heretofore possible. Heretofore, V-rings have generally been manufactured by removing the material by means of a lathe or screw machine from a bar of round stock. This process is relatively expensive on account the time required and the amount of material wasted. In order to accomplish the aims of the present invention, the invention comprises forming from sheet material a cup-shaped disk having an annular flange wedge shaped in section and in making a central hole in the disk in order to provide a V-ring which receives the tubular core of the commutator and fits into an annular groove provided by the commutator segments.
Other and further objects and advantages of the present invention will be apparent from the following description, reference being had to the accompanying drawings wherein a preferred embodiment of one form of the present invention is clearly shown.

In the drawings:

Figs. 1, 2, and 3 are views partly in section showing progressive stages of the operation of a punch press to form from sheet material a cup-shaped disk;

Figure 1:
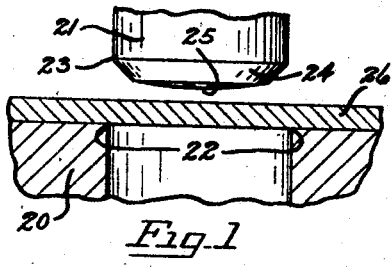
Figure 2:
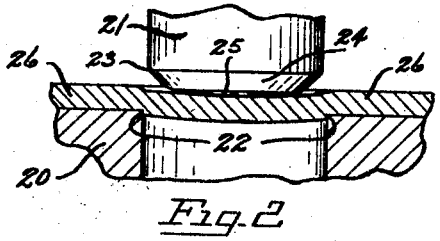
Figure 3:
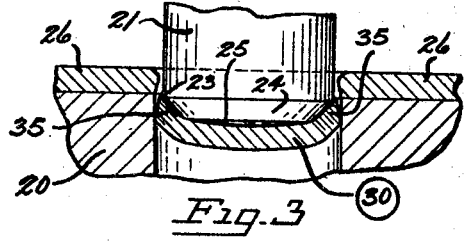

In Fig. 1, 20 indicates a die having an aperture for receiving a punch 21. The circular shearing edge 22 of the die 20 is larger in diameter than the shearing edge 23 of the punch 21 by an amount which is greater than that employed in ordinary punching operations. For a die aperture 1¼ inches in diameter the punch will be about .035 inch less in diameter. The punch 21 is provided with end surfaces including conical portion 24 and a substantially spherical portion 25. In Fig. 1, 26 indicates a strip of flat material. In Fig. 2, the punch is shown in engagement with the material 26. The surface 25 of the punch first engages the material 26 and forces it into the die 20. The material is sheared by the shearing edge 22 of the die as the material is forced downwardly into the die. As the punch enters the die 20, the portion of the strip 26 over the die is bowed downwardly. The shearing action does not continue substantially after the stage shown in Fig. 2 has been reached; but when there has been a substantial reduction in thickness of the material adjacent the shearing edge 22, the material will begin to tear apart and will finally be disrupted as shown in Fig. 3. This figure shows a rough disk or slug of material which has been cupped through the action of the punching die, so that the interior surface thereof includes a substantially conical surface 31 merging into a substantially spherical concave surface 32. The side edge of the slug includes the portion 33 which has been sheared by the edge 22 of the die 20 and substantially conical portion 34 formed as the result of the tearing of the slug 30 away from the metal of the flat stock 26. The slug 30 includes therefore an annular flange 35, indicated by the closely spaced section lines, which is wedge shaped in cross-section.

The next step in the process of manufacture is to decrease the thickness of the slug at the center and increase the sectional dimensions of this wedge shaped flange which serves as a nucleus to which material of the slug is added to form the required wedging section. To accomplish this, the slug 30 is inverted in coining die which comprises a member 36 having a conical recess 37 merging into a cylindrical aperture 38 for receiving a plunger 39. Plunger 39 is provided at its end with a plane surface 40 and a conical surface 41. The upper member 42 of the press is provided with an annular plane surface 43, a conical surface 44 and a plane end surface 45.

Figure 4:
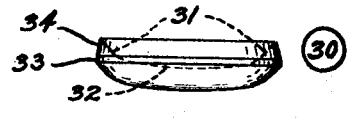
Fig. 4 is an edge view of the disk formed by the apparatus shown in the foregoing figures.
Figure 10:
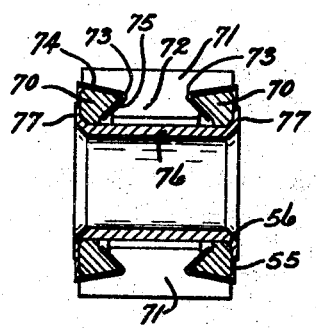
Fig. 10 is a sectional view of a commutator showing the use of clamping rings made by the present process.
Figure 6:
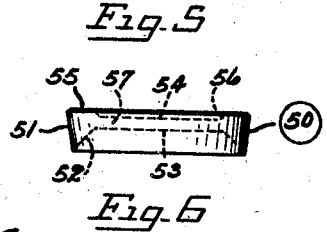
Fig. 6 is a side view showing the shape taken by the disk after being operated upon by the coining press shown in Fig. 5;

The die members form the slug 30 into the disc 50 shown in Fig. 6. While the annular flange 35 is confined between surfaces 37 and 41, the material of the center of the slug 30 has been squeezed toward the conical surface 37 of the die 36 so as to provide a conical outer edge surface 51 which is wider than the combined surfaces 34 and 35 of the slug 30. The inner surface of the slug 30 and 31 has been formed into a surface 52 of the disc 50 which is about the same in width as the surface 31 in Fig. 4 but is more nearly conical. The concave surface 32 of slug 30 has been flattened into plane surface 53. The convex outer surface of the slug 30 has been flattened into a plane surface 54 which is located inside of an annular plane surface 55 which meets with the conical surface 51 at the edge of disk 50. The surfaces 54 and 55 are joined by a narrow annular conical surface 56 for the purpose of providing a countersink or chamfered edge, the use of which will be more apparent hereinafter.

Figure 7:
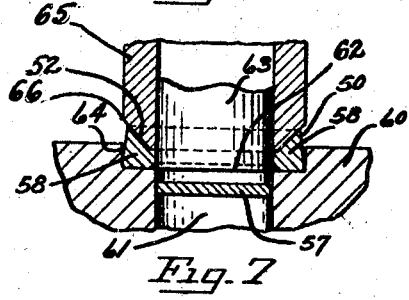
Fig. 7 is a view partly in section showing the punching of the central aperture in the disk.

The slug 30 has therefore been formed into a disc 50 having a central web portion 57 (Fig. 6) less in thickness than the slug 30 and an annular portion 58 (Fig. 7) wedge-shaped in cross-section and having a cross-sectional area greater than the nucleus flange 35 of the slug 30. Disk 50 is then inverted over a die 60 provided with an aperture 61 for receiving the shearing edge 62 of a punch 63. The die 60 is provided with a recess 64 for loosely receiving the disk 50. A tubular centering member 65 which fits the punch 63 closely has a conical end surface 66 which engages the conical surface 52 of the disk 50 in advance of the engagement of punch 63 with disc 50. Member 65 is held in engagement with the disk 50 by spring pressure during the punching operation. By such device the aperture in the disk 50 will be concentric with the conical surface 52.

Figure 8:
Figs. 8 and 9 are edge and side views, respectively, of a completed clamping V ring.
Figure 9:
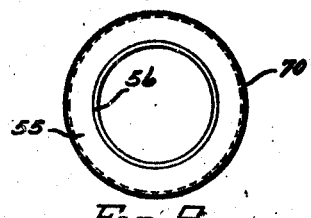

The commutator to which the finished V-ring indicated by 70 in Figs. 8 and 9 is applied, comprises an annular ring of insulated commutator bars 71. Each bar is provided with a dove-tail portion 72 so that the annulus of bars provides annular V-groove 73 at each end of the ring. The V-grooves 73 are lined with insulating material 74 and 75, and each V-groove receives one of the clamping V-rings 70 which is mounted upon a metal tube 76. The annulus of commutator bars is clamped between the V-rings 70 and the rings are secured in position by flaring the ends 77 of the tube 76 over the countersunk portions 56 and against the plane portions 55 of the V-rings.

The method disclosed herein includes operations upon a piece of flat material which is thinner than the finished V-ring at its outer edge but thicker than the V-ring at the parts surrounding its aperture. The first step in the process includes the formation of a dished or cupped disk or slug having an annular flange which is wedge shaped in section and which provides a nucleus to which other material of the disk is added. The second operation performed by the apparatus shown in Fig. 5 confines the nucleus referred to in a V-shaped annular groove provided between the surfaces 41 and 37 of the plunger 39 and the die 36, respectively. While this nucleus is maintained so that it will not be substantially deformed by subsequent operations, the metal of the center portion of the disk is caused to flow radially toward the outer edge of the disk so that this metal is forced from the center of the disk against the surface 37 and the die 36. The result is, that the disk is made much thinner in the center than the thickness of the original stock and this material from the center of the disk has been added to the nucleus referred to so as to provide an annular portion wedge shaped in cross section. This building upon the nucleus provides a material addition to the surface 34 of the disk 30. In other words, the surface 34 which forms the beginning of one of the clamping surfaces of the rings 70 has been widened to form the surface 51. The surface 31 of the rough disk 30 has not materially extended in width, but has been changed to a surface 52 which is more nearly conical. The final operation provides an aperture in the disc and also finishes the surfaces 65 which are engaged by the flared end 76 of the tube 75.

Figure 5:
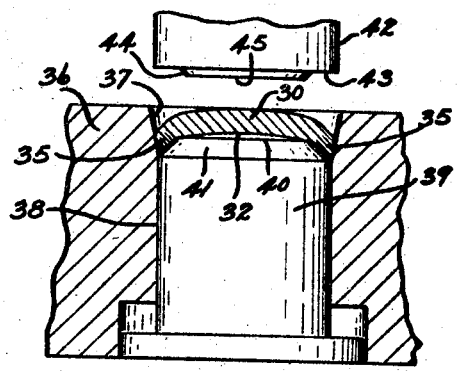
Fig. 5 is a view partly in section showing a coining press with the disk shown in Fig. 4 inverted.

The plunger 39, shown in Fig. 5, is movable upwardly through the die 36 after the punch 42 recedes from the die 36 so as to eject the disk 50 from the die.

While the form of embodiment of the invention as herein disclosed, constitutes a preferred form, it is to be understood that other forms might be adopted, all coming within the scope of the claims which follow.

What is claimed is as follows:

1. The process of making a clamping ring for commutators, which includes forming a dished disk having a flange wedge-shaped in cross-section, then coining the disk to decrease the thickness of the central portion thereof and increase the sectional dimension of the wedge-shaped flange from the apex thereof to the side opposite, and providing an aperture in the disk, concentric with the flange.

2. The process of making a clamping ring for commutators, which includes forming by partly shearing and by partly tearing from sheet material a slug having a burred peripheral edge wedge-shaped in cross section, then coining the slug so as to increase the sectional dimension of the wedge-shaped flange from the apex to the opposite side thereof, then providing an aperture in the slug concentric with the flange.

3. The process of making a clamping ring for commutators, which includes punching a slug from sheet material so that it will have a peripheral burred edge wedge-shaped in cross-section, supporting the converging surfaces of the burred edge and subjecting the central portion of the slug to a coining operation to increase the sectional dimension of the wedge-shaped burred edge from the apex to the side opposite thereof, and providing an aperture in the slug concentric with the flange.

In testimony whereof I hereto affix my signature.

JOHN J. CARTER.